July 18, 1961 G. E. HOEDINGHAUS ET AL 2,992,833
OSCILLOSCOPE OR INSTRUMENT CART-CARRIER
Filed Oct. 22, 1959 2 Sheets-Sheet 1
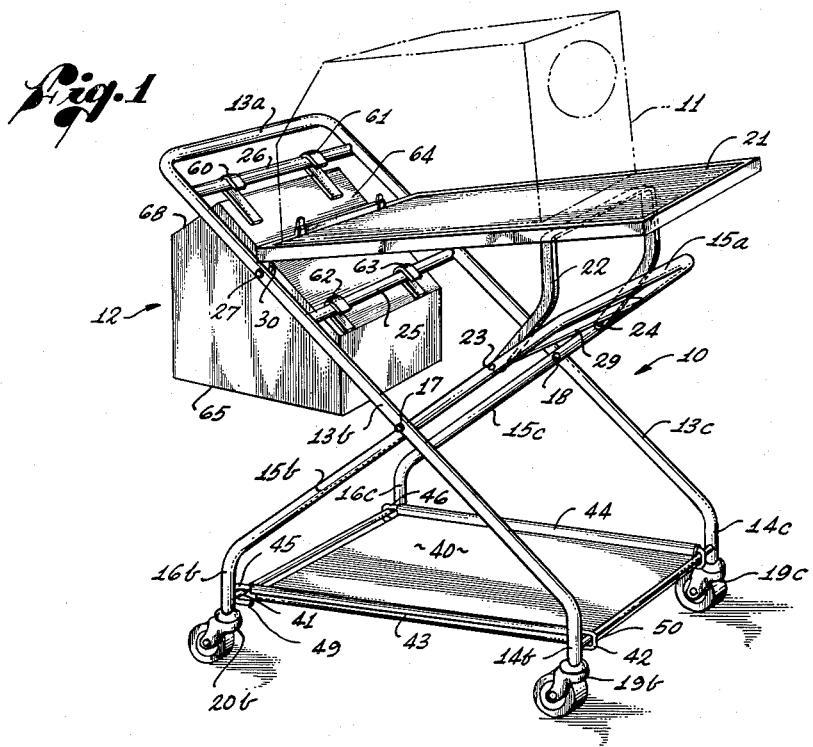
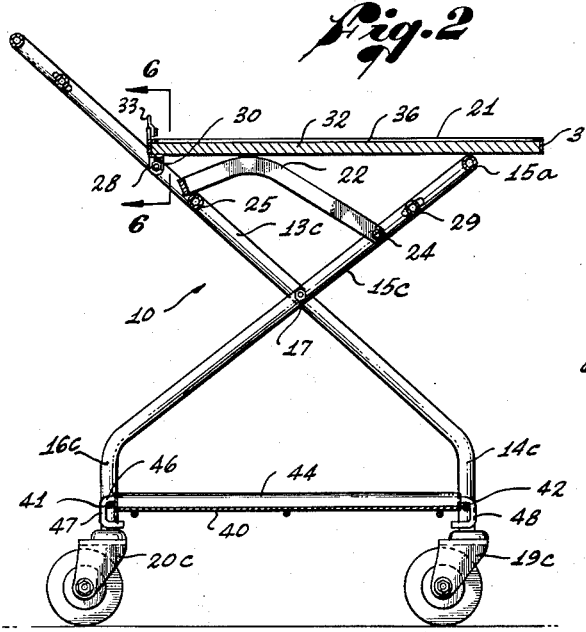
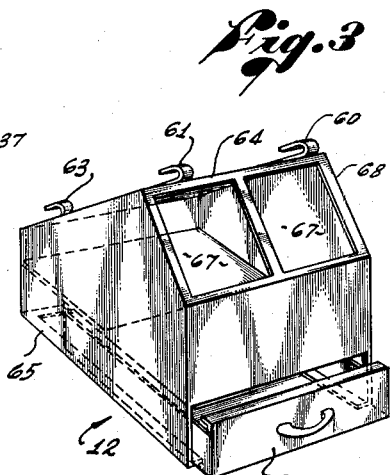
INVENTORS
GEORGE E. HOEDINGHAUS
RALPH G. SANDERS
BY Fulwider Mattingly & Huntley
Attorneys July 18, 1961  G. E. HOEDINGHAUS ET AL  2,992,833
OSCILLOSCOPE OR INSTRUMENT CART-CARRIER
Filed Oct. 22, 1959  2 Sheets-Sheet 2
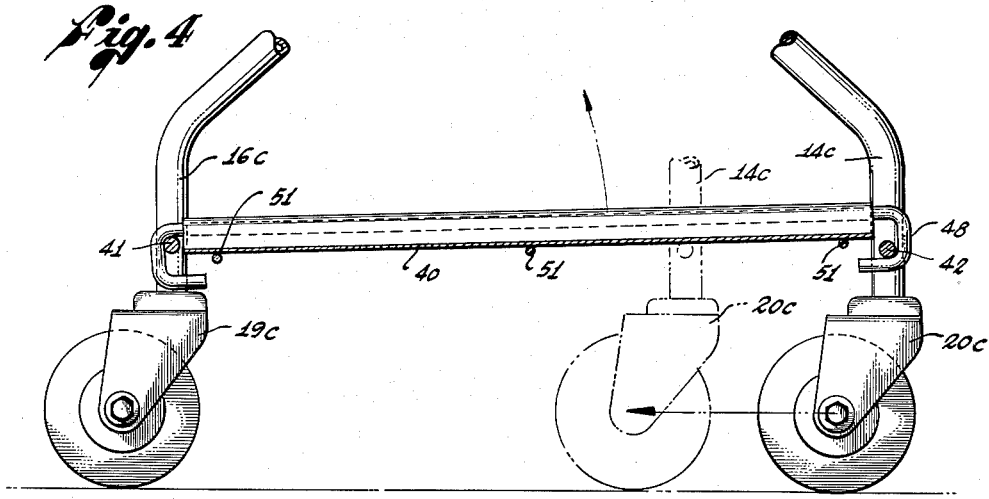
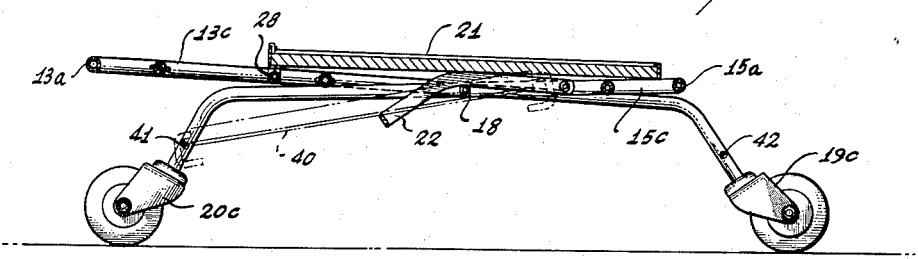
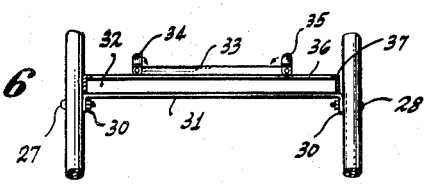
INVENTORS
GEORGE E. HOEDINGHAUS
RALPH G. SANDERS
BY
Attorneys

United States Patent Office 2,992,833
Patented July 18, 1961

2,992,833
OSCILLOSCOPE OR INSTRUMENT
CART-CARRIER
George E. Hoedinghaus, 930 Sherlock Drive, and Ralph G. Sanders, 1700 Oak St., both of Burbank, Calif.
Filed Oct. 22, 1959, Ser. No. 848,038
5 Claims. (Cl. 280—41)

This invention relates generally to carriers and more particularly to a collapsible cart for movably supporting electronic instruments, such as an oscilloscope or the like, in such a fashion that although the cart may be folded for convenient storage, it is nonetheless rigidly sturdy when extended for use.

There is an increasing recognition of the fact that the correct handling equipment for electronic and other intruments greatly facilitates their optimum use. Such instruments, when provided with a mobile carrier are more readily available where needed, in the most convenient position for a given use. Mobility makes the use of the equipment more flexible, and there is considerable gain over a stationary installation.

Carriers or carts in accordance with the present invention are thus suitable not only for transporting instruments between stationary work benches, but also they are themselves movable work benches and allow arrangements and set-ups of electronic instruments and equipment which would be hard to achieve without mobility.

Although the instrument cart to be described herein is especially adapted for an oscilloscope and is provided with a pivoted top tray which may be supported in either a horizontal position or at a preferred 22° angle for reading an oscilloscope, nonetheless it will be seen that the carrier described herein is also a general instrument cart, a mobile demonstrator table, mobile test stand, and may be used for innumerable other purposes around shops and labs. The cart affords unlimited mobility, balanced safety, and excellent working convenience.

Use of the cart permits electronic test equipment to be moved, turned, and tilted for easiest reading. This flexibility greatly increases productivity both in production operation as well as in pre-production and pilot runs where such flexibility of equipment arrangement may often be critical.

It is therefore an object of this invention to provide an improved mobile carrier.

It is a further object of this invention to provide a cart for supporting electronic instruments, such as oscilloscopes and the like.

Another object of this invention is to provide such a cart which is collapsible for ease of storage but which is rigidly sturdy in its extended operating position and is well balanced for safety of the equipment supported in use.

It is still another object of this invention to provide such a cart which is easily collapsible for storage but which can be securely locked in the operating position in such a fashion that it cannot be accidentally collapsed.

It is yet another object of this invention to provide such a collapsible cart which is locked in operating position in such a manner that it is necessary to lift upwardly at two separate points on the cart simultaneously in order to collapse it.

A still further object of this invention is to provide such a cart having an upper tray which is pivotally mounted to position an oscilloscope at an optimum reading angle and a lower tray which also serves as a locking member for the cart.

It is a further object of this invention to provide such a cart having means for mounting a removable accessory cabinet to provide even greater instrument handling capacity.

These and other objects, features, and advantages of the present invention will be more fully apparent to those skilled in the art from the following detailed description taken in connection with the accompanying drawings in which like reference characters refer to like parts throughout and wherein:

FIGURE 1 is a perspective view of the cart in extended operating position supporting an oscilloscope (shown in phantom) and having the associated equipment cabinet mounted thereon.

FIGURE 2 is a central vertical sectional view through the cart shown in FIGURE 1 with the pivoted top tray in its horizontal position.

FIGURE 3 is a perspective view of the equipment cabinet adapted to be mounted on the cart.

FIGURE 4 is a sectional view partly broken away and on an enlarged scale showing the lower portion of the cart shown in FIGURE 2 and illustrating the manner in which the locking means is released in order to collapse the cart for storage.

FIGURE 5 is a central vertical sectional view of the cart in its collapsed or folded position.

FIGURE 6 is a sectional view taken on the line 6—6 of FIGURE 2.

Turning now to the drawings and in particular to FIGURE 1 thereof, there is shown a collapsible cart 10 for movably supporting electronic instruments, such as the oscilloscope 11. A removably mounted auxiliary equipment cabinet 12 may also be carried by the cart 10. Such equipment as input amplifiers and the like may be conveniently supported in the cabinet 12.

The cart 10 is formed basically from a pair of U-shaped frame members one of which is longer than the other and both of which are preferably formed from chromium plated steel tubing. The first or longer frame has a top member 13a and two generally parallel side or arm members 13b and 13c, respectively. Each of the side members 13b and 13c has an offset portion 14b and 14c, respectively, at the lower end thereof. The second U-shaped frame has a top member 15a and the two generally parallel side or arm members 15b and 15c each of which is similarly provided with an offset lower end portion 16b and 16c, respectively.

The top member 13a of the longer frame member is slightly wider than the top member 15a of the short frame member so that the side arms 15b and 15c are receivable between the side arms 13b and 13c when the cart is assembled as shown in FIGURE 1. It will be noted from FIGURE 1 that the side arms of the second or shorter frame are pivotally connected to the side arm of the first or longer frame as at 17 and 18 respectively to form crossed pairs of legs pivoted near the centers thereof in a collapsible general X-shaped configuration.

The pivot connections 17 and 18 may conveniently comprise contour head bolts extending through holes drilled in the tubular frame members and held securely in position by lock nuts. An aluminum washer is preferably positioned between the crossed frame members at the pivot point.

Relatively large rubber tired wheels, such as the caster wheel assemblies 19b, 19c, 20b, and 20c are attached respectively to the offset or leg portions 14b, 14c, 16b, and 16c of the frame members.

A top tray 21 is pivotally attached at one end, at 27 and 28, between the upper portions of the side members 13b and 13c of the first or longer frame. The tray 21 rests in sliding engagement on the top member 15a of the second or shorter U-shaped frame when the tray 21 is in the horizontal position shown in FIGURE 2. A U-shaped bracket member 22 is pivotally attached between the upper portions of the side members 15b and 15c of the shorter frame. The bracket 22 is movable between a first limit position shown in FIGURE 2 wherein the bracket 22 is out of engagement with the tray 21 and a second limit position shown in FIGURE 1 wherein the bracket 22 is interposed between the tray 21 and the shorter frame member in order to support the pivotally mounted tray 21 in a position elevated at an angle with respect to the horizontal.

The bracket 22 is composed of chrome plated steel strap stock and is pivotally mounted as at 23 and 24 by any convenient means, such as nut and bolt assemblies. In the first position shown in FIGURE 2, the bracket 22 is stopped or limited in its travel by a horizontally extending cross member 25 which is welded between the side members 13b and 13c. A similar horizontally extending cross member 26 is also welded to extend horizontally between these side members above the pivot points 27 and 28 of the tray 21 for a purpose which will be described in detail below.

A similar horizontally extending tubular cross member 29 is welded between the arms 15b and 15c of the shorter frame member above the pivot points 23 and 24 of the bracket 22. As may be best seen in FIGURE 1, the horizontal cross member 29 stops or limits the motion of the pivotally mounted bracket 22 in the position shown in FIGURE 1 wherein the flat horizontal member of bracket 22 supports the tray 21 in an elevated position so that the top of the tray makes an angle of preferably 22° with the horizontal plane defined generally by the pivot points 27 and 28 of the tray and the top member 15a of the shorter U-shaped frame. The above noted preferred angle of 22° has been empirically found to be the most convenient angle at which an oscilloscope 11 should be supported in order to facilitate easy reading of the instrument when it is mounted on a cart of the type shown having a maximum tray height substantially equal to the usual normal height of a work bench.

The pivoted connection 23—24 of the bracket 22 may be formed by a nut and bolt at each point holding the bracket 22 against a washer interposed between the bracket and the shorter U frame. A similar nut, bolt and washer assembly may be used at 27 and 28 to pivot the tray 21. These nut and bolt assemblies are secured through depending ears 30 on each side of the tray. As may be most clearly seen in FIGURE 6, the depending ears 30 are integrally formed with a strap member 31 which is screwed or otherwise secured to the bottom surface of the wooden board 32 preferably forming the tray 21. Strap 31 has an upstanding flange member 33 also formed integrally therewith which projects above the top surface at the rear or pivoted end of the tray 21 to act as a stop to limit the sliding travel of an oscilloscope on the tray when the tray is tilted as shown in FIGURE 1. A pair of pivotally mounted ears 34 and 35 are secured to the flange 33 to increase the effective stopping height when it is desirable for instruments mounted on legs or other mounting means which might permit the instrument to clear the stopping flange 33.

As noted, the board 32 forms the base of tray 21 and has the strap member 31 secured thereto. A sheet 36 of plastic, such as "Formica" or other suitable surfacing material, is provided on the top surface of the board 32 and is held in position by aluminum molding 37 which in turn is secured to the sides of the board 32.

A second tray 40 is provided for the carrier 10 and is positioned beneath the tray 21 in a generally horizontal position. First and second rods 41 and 42 extend respectively between the lower offset portions 16b and 16c and 14b and 14c of the U frame members. The rods 41 and 42 are welded or otherwise integrally and rigidly attached to the offset portions of the U frame members. The tray 40 is removably supported upon and in locking engagement with the rods 41 and 42 in a manner to be described below.

The tray 40 consists of a piece of sheet metal having generally U-shaped flanges or channels 43 and 44 projecting upwardly from each side thereof. Metal rods 45 and 46 are spot welded inside the uppermost or curved portion of the U and project outwardly beyond the ends of the channel-like flanges 43 and 44. As may be most clearly seen in FIGURE 2, the rod 46, for example, has hook or U-shaped portions 47 and 48, respectively, at each end thereof. The rod 45 is provided with similar hooked shaped protrusions 49 and 50, respectively, at each end thereof.

The hooked rod portions 47, 48, 49, and 50 project downwardly below the sheet metal tray 40 and have a return portion projecting below the tray. As will be seen in FIGURE 2, the fact that the top of the hook seats in the upwardly extended flange portions 43 and 44 permits the tray sheet 40 supported by the hooks to be positioned at a level slightly below the center of the cross rods 41 and 42. The tray 40 has a length substantially equal to the distance between the rods 41 and 42 and this contributes to the locking action of the tray 40. Of course, the hook members 47, 48, 49, and 50 which are slipped over the rods 41 and 42 when the wheels are pushed together, as shown in phantom in FIGURE 4, also cooperate in the locking action of the tray. Specifically, the hook members prevent the U-shaped frame members from collapsing downwardly and thus separating the wheels by a distance greater than the separation of the opposed hooks when the tray is in position. The tray 40 prevents the rods 41 and 42 from being urged together while the tray is in position and thereby prevents the frame member from being accidentally lifted upwardly so as to urge the wheels closer together. Thus, the tray 40 prevents wheels 19c and 20c from being moved together whereas the hooks 47, 48, 49, and 50 prevent these wheels from being moved apart.

With the tray 40 in position, the frame is thus locked in the position shown in FIGURES 1 and 2. It will be noted that the hooked locking means projects around and under the rods 41, 42 so that the locking means of tray 40 is disengageable to collapse the cart only by simultaneously lifting upwardly both on the tray and on one of the U-shaped frame members.

The manner of disengaging the tray 40 is illustrated in FIGURES 4 and 5. In FIGURE 4, the tray 40 is shown with the right hand end lifted upwardly until the bottom of the hook 48 is stopped by the cross rod 42. Of course, the tray 40 is held in this position by one hand of the user or operator (not shown). In order to fully disengage the tray, it will be seen from FIGURE 4 that it is now necessary to move the caster 20c and leg 14c to which the rod 42 is attached from the full line position to the dotted line position. That is to say, it is necessary for the operator while holding the tray 40 in the position shown in FIGURE 4 to simultaneously lift upwardly on one of the U-shaped frames, preferably on the handle member 13a so as to move the casters or wheels closer together to the phantom line position, shown in FIGURE 4. When this is done, the rod 42 slides between the hook member 48 and one of the small reinforcing rods or wires 51 which are welded to the bottom of the tray 40 to give it additional rigidity and strength.

When the tray 40 has been lifted to the position shown in FIGURE 4 and the wheel or caster assembly 20c moved to the phantom line position so as to disengage the hook 48 from the rod 42, the cart assembly may readily be collapsed to the position shown in FIGURE 5. It will be noted that the tray 40 in this position is dimensioned so that it can be received between and supported at one end by the nuts on the pivoting bolts 17 and 18. Of course, either end of the tray 40 can be disengaged from the rod to which it is normally hooked. In the drawings, there has been illustrated the procedure whereby the right hand end of the tray 40 is disengaged from the rod 42. However, the left hand end of the tray could equally well be disengaged from the rod 41 or the tray could readily be disengaged from both ends and entirely removed from the cart if desired. The position shown in FIGURE 5 is, however, a compact and convenient one in which the cart may suitably be stored or packed for shipment.

In FIGURE 3, there is shown a cabinet 12 which may be attached to the cross rods 25 and 26 between the arms 13b and 13c of the longer U-shaped frame member in the manner shown best in FIGURE 1. The cabinet 12 is supported from the cross rods 25 and 26 by hooks 60, 61, 62, and 63 which are slidably engaged over the rods. The cabinet 12 has a sloping rear wall 64 to which the hooks are welded and which makes an angle with the bottom 65 of the cabinet equal to the normal angle made with the horizontal by the U frame members when the cart is in its operating position shown in FIGURES 1 and 2, so that the bottom 65 of the cabinet 12 is normally positioned in the horizontal plane.

A drawer 66 is provided to be slidably mounted on the bottom 65 of the cabinet and is adapted to contain small tools, books, etc. Compartments 67 are formed within the cabinet and preferably open outwardly to the sloping front 68 thereof. The compartments 67 are shaped and dimensioned to receive electronic equipment, such as the input amplifiers commonly used with the particular oscilloscope for which the cart is intended.

It is thus seen that the cart assembly of our invention affords a substantial amount of conveniently usable space and is adapted to sturdily support a maximum amount of equipment. Instruments, such as the oscilloscope 11 are readily positioned on the tray 21. Auxiliary apparatus, such as input amplifiers for the oscilloscope may be positioned in the cabinet 12 and other auxiliary apparatus, such as an electronic switch or any other described instruments may readily be positioned on the tray 40.

In use, the cart is thus provided with two trays and a cabinet. When it is desired to collapse the cart for storage, one of these trays which serves as a locking means for the cart is disengaged and the cabinet 12 is removed in order to collapse the cart down to the compact position shown in FIGURE 5. The cabinet 12 is made removable so that it may be separately stored.

While a particular exemplary preferred embodiment of the invention has been described in detail above, it will be understood that modifications and variations therein may be effected without departing from the true spirit and scope of the novel concepts of the present invention, as defined by the following claims.

We claim:

1. A collapsible cart for movably supporting electronic instruments, such as oscilloscopes and the like comprising: first and second generally U-shaped frames each having a top member and two generally parallel side members; each of said side members having an offset end portion; the side members of said second frame being pivotally connected to the side members of said first frame to form therewith crossed pairs of legs pivoted near the centers thereof; a first tray pivotally attached at one end between the upper portions of the side members of said first frame and resting when in a horizontal position in sliding engagement on the top member of said second frame; a U-shaped bracket pivotally attached between the upper portions of the side members of said second frame and movable between a first limit position in which it is out of engagement with said first tray and a second limit position in which it is interposed between said first tray and said second frame to support said first tray at a predetermined angle to the horizontal; wheels mounted on the offset lower end portions of each of said side arm members; rod members rigidly interconnecting said lower offset end portions of said side members of each of said U-shaped frames respectively; and locking means holding said frames in rigid extended position.

2. Apparatus as in claim 1, wherein said locking means comprises a second tray mounted on and between said rod members.

3. A collapsible cart for supporting electronic instruments, such as oscilloscopes and the like, comprising: first and second generally U-shaped frames each having a top member and two generally parallel side members; each of said side members having an offset end portion with a caster mounted thereon; the side members of said second frame being pivotally connected to the side members of said first frame to form therewith crossed pairs of legs pivoted near the centers thereof; a first tray pivotally attached at one end between the upper portion of the side members of said first frame and resting when in a horizontal position in sliding engagement on the top member of said second frame; a U-shaped bracket pivotally attached between the upper portions of the side members of said second frame and movable between a first limit position in which it is out of engagement with said first tray and a second limit position in which it is interposed between said first tray and said second frame to support said first tray at an angle of approximately 22° to the horizontal; means to detachably mount an auxiliary equipment cabinet on said first frame; rod members rigidly interconnecting said lower offset end portions of said side members of each of said U-shaped frames, respectively; and locking means comprising a second tray mounted between said rod members and positively preventing both folding and further extension movements of said frames.

4. In a collapsible cart of the type having first and second generally U-shaped frame members pivotally connected together near the centers thereof to form crossed pairs of legs, the improvement comprising: rod members rigidly interconnecting the lower ends of the side members of each of said U-shaped frames, respectively; a tray, said tray being mounted in depending relationship between a pair of support members extending longitudinally along the side of said tray, each of said support members having hook means at each end thereof; said hook means being engageable with said rod members to lock the lower portion of said frame members in predetermined spaced relationship to each other to form a rigid frame, said hook members limiting pivotal movement of said frame in one direction and said tray member abutting against said rod members to limit pivotal motion of said frame in the opposite direction, said tray being disengageable from said rod members to collapse said cart only by simultaneously lifting upwardly both on said tray and on one of said U-shaped frame members.

5. A collapsible cart for electronic instruments, such as an oscilloscope or the like, comprising: first and second generally U-shaped frame members pivotally interconnected near the centers thereof to form crossed pairs of legs; a first tray pivotally attached at one end to one of said frame members and resting when in a horizotnal position in sliding engagement on the top of the other of said frame members; means to support said tray in a second position at an acute angle with respect to said horizontal position; rod members rigidly interconnecting the lower ends of each of said frame members, respectively; a second tray suspended between mounting hooks at the corners thereof; said second tray being mountable in hooked engagement between said rod members to hold the lower portion of said frames in a predetermined spaced relationship to each other to form a rigid structure; said tray abutting against said rod members to limit pivotal motion of said frames in one direction and the mounting hooks of said tray passing around and under said rods to limit pivotal motion of said frames in the other direction, said mounting hooks being disengageable from said rods to collapse said cart only by simultaneously lifting upwardly both on said second tray and on one of said U-shaped frame members.

References Cited in the file of this patent

UNITED STATES PATENTS

| | | |
|---|---|---|
| 710,790 | Magerhans | Oct. 7, 1902 |
| 907,423 | Tilley | Dec. 22, 1908 |
| 930,394 | Bourgiois | Aug. 10, 1909 |
| 1,951,695 | Harter | Mar. 20, 1934 |
| 2,155,896 | Goldman | Apr. 25, 1939 |
| 2,544,220 | Concklin | Mar. 6, 1951 |
| 2,577,579 | Hall | Dec. 4, 1951 |

FOREIGN PATENTS

| | | |
|---|---|---|
| 667,363 | Great Britain | Feb. 27, 1952 |